United States Patent
Dufour et al.

[15] 3,678,560
[45] July 25, 1972

[54] INTERNAL PIPE SEALING SYSTEM
[72] Inventors: Raymond J. Dufour, Wheaton, Ill.; James J. Grimm, Columbus, Ohio
[73] Assignee: Northern Illinois Gas Company, Aurora, Ill.
[22] Filed: May 6, 1970
[21] Appl. No.: 35,140

[52] U.S. Cl. .................................. 29/235, 138/97, 73/46
[51] Int. Cl. .......................................... F16l 55/16
[58] Field of Search ........................ 29/235, 236, 280, 282; 269/48.1; 285/13, 15; 73/46; 138/97

[56] References Cited

UNITED STATES PATENTS

| | | | |
|---|---|---|---|
| 3,261,529 | 7/1966 | Pagan | 269/48.1 X |
| 3,561,320 | 5/1968 | Nelson | 269/48.1 X |
| 2,481,013 | 9/1949 | Henderson | 73/46 UX |

Primary Examiner—Andrew R. Juhasz
Assistant Examiner—J. C. Peters
Attorney—Johnson, Dienner, Emrich, Verbeck & Wagner

[57] ABSTRACT

An internal pipe sealing system comprising a sealing device and seal installation equipment. The sealing device is constructed of an outer elastic sealing member and an inner expandable retainer member.

The seal installation equipment includes a seal installation tool designed to be pulled through the inside of a pipe and comprises a joint locator, a seal expander, and a seal magazine-loader. The seal magazine-loader carries a plurality of sealing devices and forwards them one at a time to the seal expander. The seal expander has a plurality of radially-expandable shoes and upon energization, these shoes move outwardly against the retainer member until the sealing member is pressed into sealing engagement with the pipe and retainer member moves to a locking position. The movement of the tool installation assembly through the pipe and the actuation of the seal magazine-loader and seal expander is controlled remotely at a control panel located above ground.

13 Claims, 21 Drawing Figures

PATENTED JUL 25 1972
3,678,560
SHEET 1 OF 9
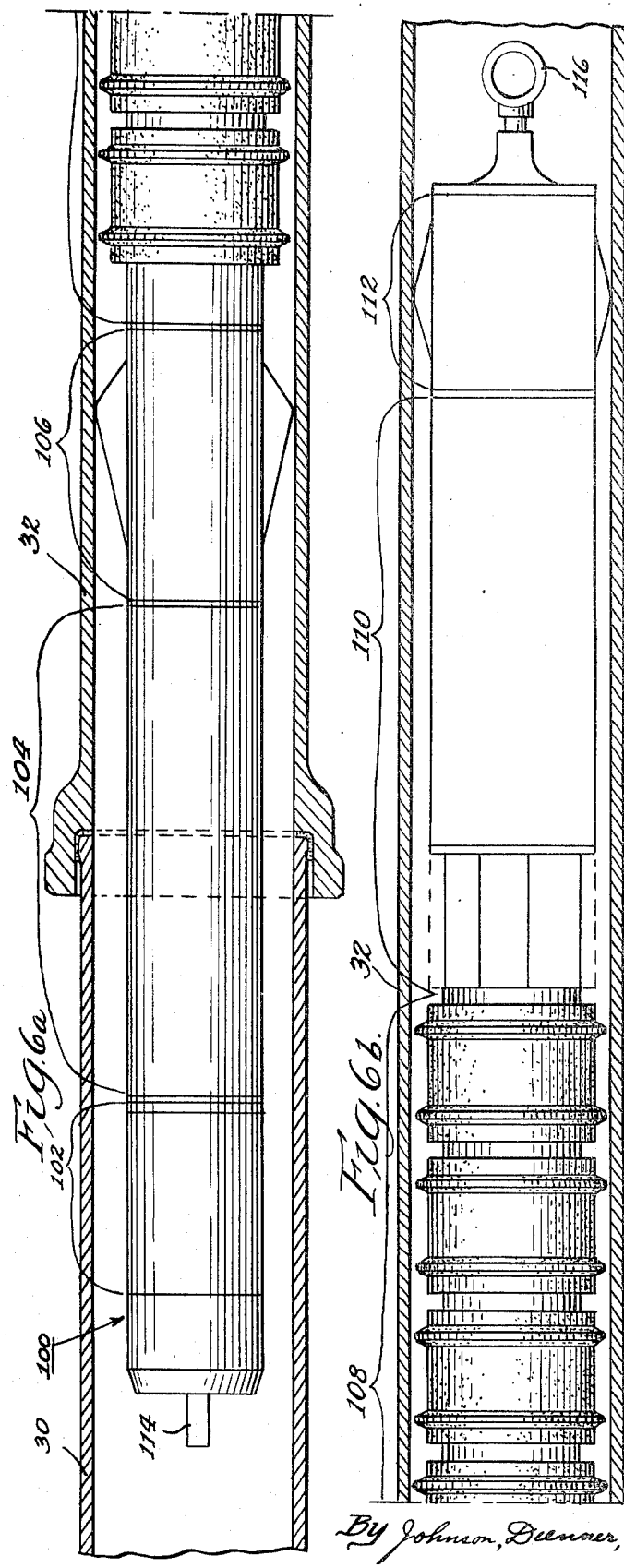
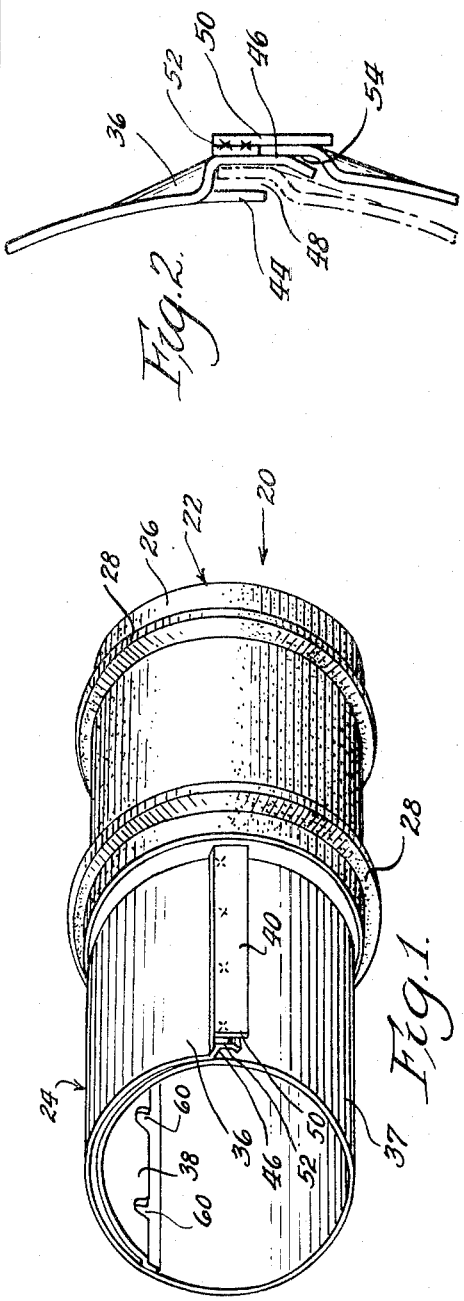
Inventors:
Raymond J. Dufour
James J. Grimm
By Johnson, Dienner, Emrich, Verbeck and Wagner
Attys.

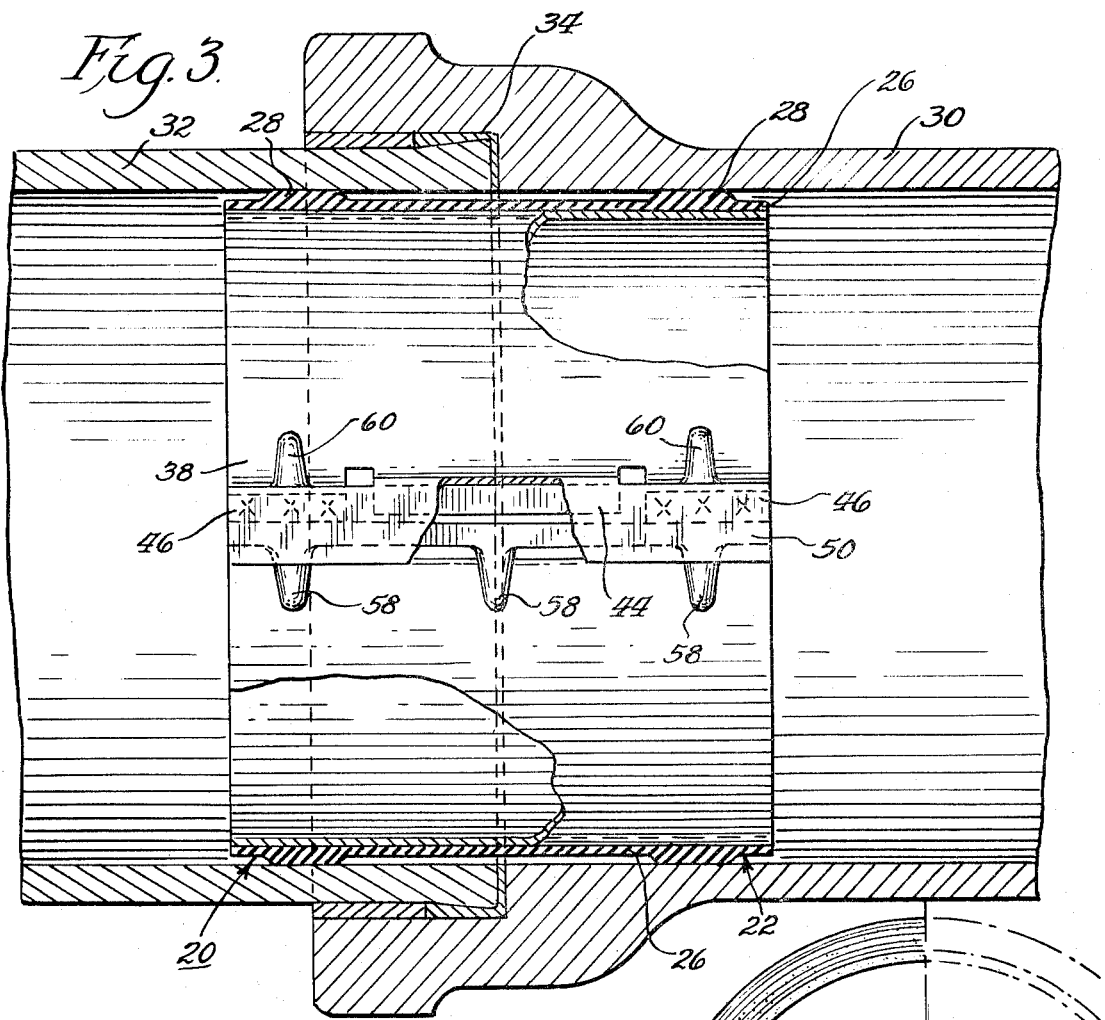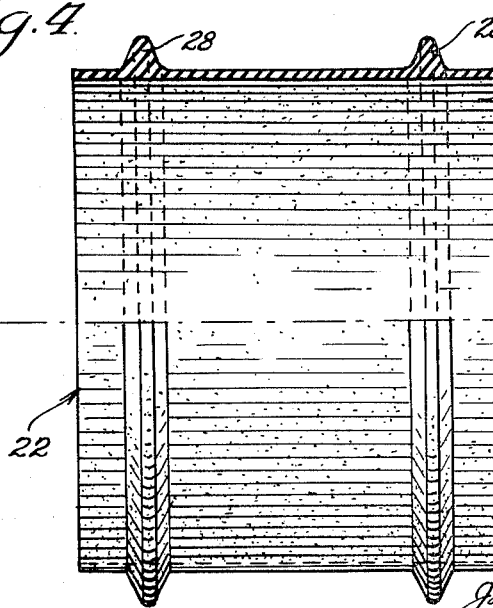

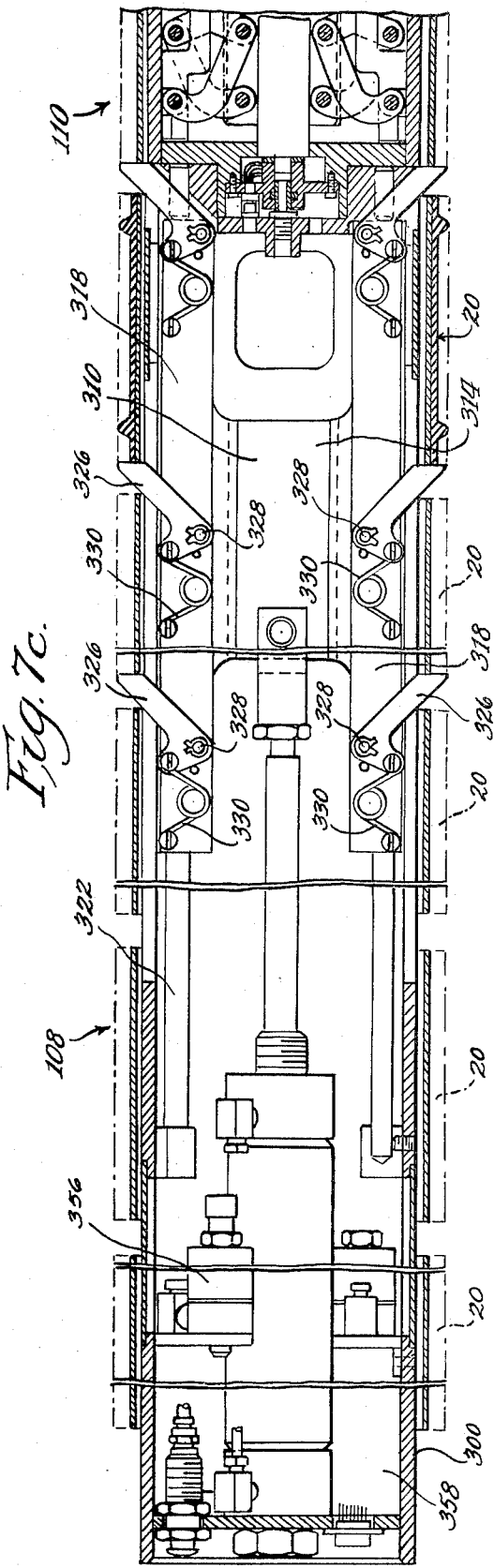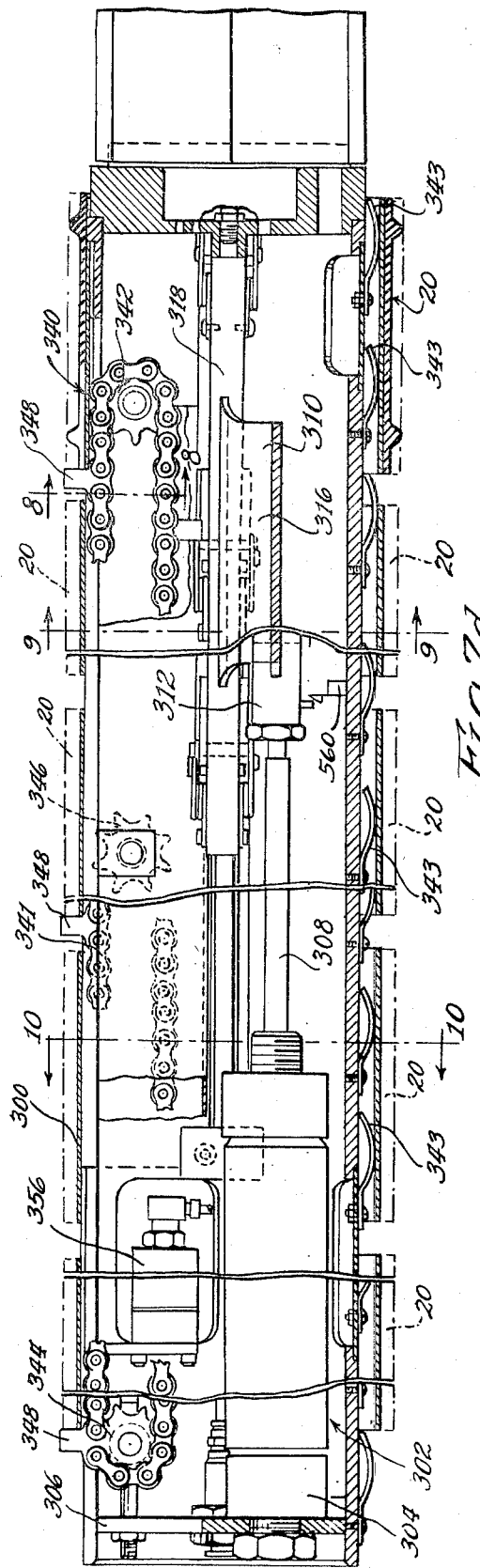

Inventors
Raymond J. Dufour
James J. Grimm
By Johnson, Dienner, Emrich, Verbeck and Wagner, Attys.

Inventors:
Raymond J. Dufour
James J. Grimm
By Johnson, Dienner, Emrich, Verbeck & Wagner
Attys.

Inventors
Raymond J. Dufour
James J. Grimm
By Johnson, Dienner, Emrich, Verbeck
and Wagner Attys.

Inventors
Raymond J. Dufour
James J. Grimm.
By Johnson, Dienner, Emrich, Verbeck and Wagner Attys.

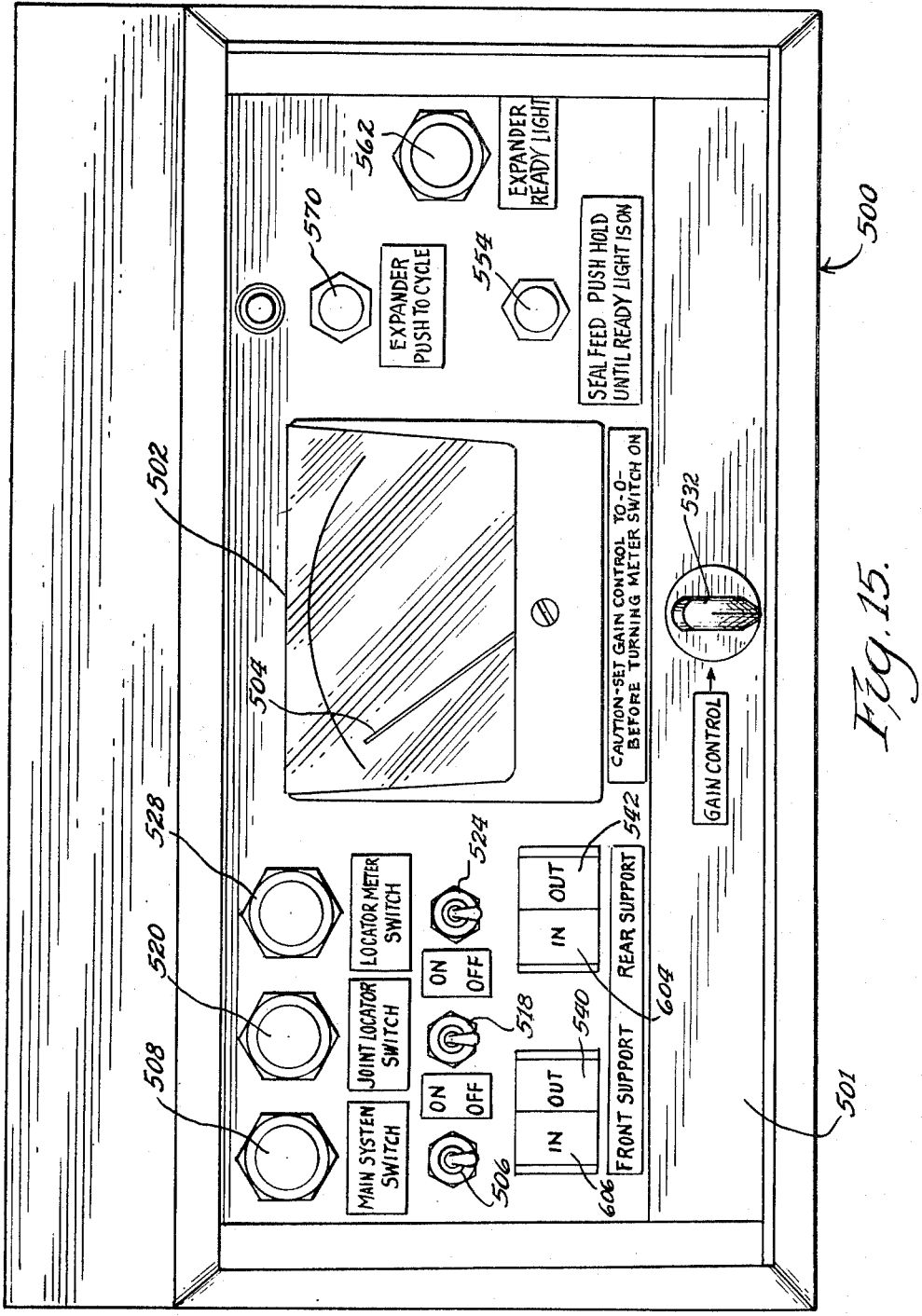

INTERNAL PIPE SEALING SYSTEM

BACKGROUND OF THE INVENTION

This invention relates to an apparatus for the sealing of pipes, and more particularly to the sealing of pipe joints, the invention being especially useful in the sealing of leaks in gas main systems.

Previous methods of repairing leaks in gas mains, or in treating joints in such pipes to prevent the development of leaks, has involved the expensive operation of excavating around each joint or leak in order to expose the pipe and applying a pipe joint clamp around the joint. Such procedures are extremely expensive in that the entire operation must be repeated at every joint.

In order to eliminate the necessity for excavation at each joint, this invention relates to an internal pipe joint sealing system which permits sealing joints from the inside of gas mains including small internal-diameter pipes.

SUMMARY OF THE INVENTION

An internal pipe sealing system comprising a sealing device and seal installation equipment.

The sealing device is composed of an inner expandable retainer member and an outer elastic sealing member. The inner retainer member in the unexpanded position has a cylindrical sleeve configuration with its end portions in an overlapping arrangement. One of these end portions has two locking grooves to accommodate a range of pipe diameters, which are adapted to receive and hold the other end. The outer elastic member has two annular spaced ridges formed of a deformable hard material which are urged against the pipe's interior by the inner retainer member to form an air-tight seal with the pipe.

The seal installation equipment includes a seal installation tool having a joint locator assembly, seal magazine assembly, seal expander assembly and front and rear centering assemblies.

The seal magazine assembly carries a plurality of sealing devices and includes a feeding mechanism for feeding them one at a time to the seal expander assembly. The seal expander assembly has a plurality of radially oriented expander shoes and power means to radially extend the expander shoes to stretch the sealing device into sealing engagement with the inside peripheral surface of the pipe section.

The seal installation equipment also includes a remotely located control panel to selectively operate: the front and rear centering assemblies to center the installation tool with respect to the pipe; the seal magazine assembly to feed a sealing device onto the expander shoes; and the seal expander assembly to extend and retract the expander shoes.

DESCRIPTION OF DRAWING

For a better understanding of this invention reference should be made to accompanying drawing, in which:

FIG. 1 is a perspective view of a sealing device with its inner retainer member removed from its outer sealing member;

FIG. 2 is an enlarged partial side view of the retainer member of FIG. 1, illustrating its two locking positions;

FIG. 3 is a sectional view of the sealing device shown in FIG. 1, illustrated in sealing engagement with a pipe joint;

FIG. 4 is a side view of the outer sealing member of FIG. 1;

FIG. 5 is an end view of FIG. 4;

FIGS. 6a – 6b form a combined side view of a seal installation tool carrying a plurality of sealing devices inside a section of a gas main;

FIG. 15 is a front view of a control panel used to operate the seal installation tool.

SEALING DEVICE

Figure 7A:
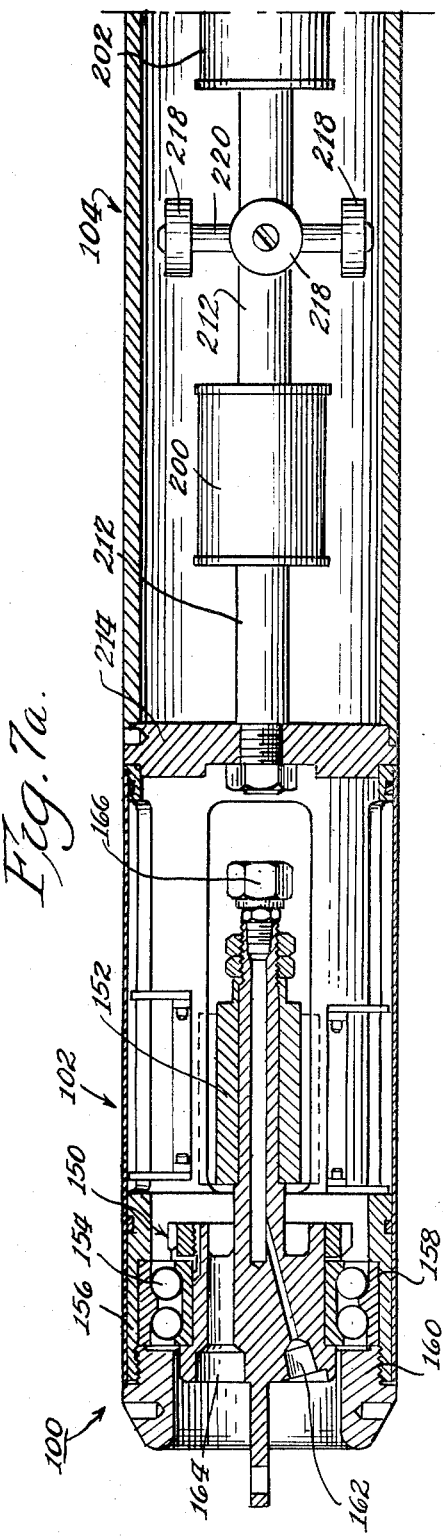
FIGS. 7a 7b form a combined enlarged sectional view of the seal installation tool of FIGS. 6a – 6b, with FIG. 7d being a top view of the portion shown in FIG. 7c.

There is shown in FIG. 1, a sealing device 20 used to effect a bubble-tight seal for stopping a leak in a gas main. Since most leaks in gas mains occur between joints of adjoining pipe sections, the sealing device 20 is particularly designed to form a seal on either side of a joint such as illustrated in FIG. 3. The sealing device 20 is formed by two components: an outer sealing member 22 and an inner retainer member 24.

The outer sealing member 22 is made of an elastic material, such as rubber, in the form of a band configuration and has a cylindrical body portion 26 on which are integrally formed a pair of annular ridges 28 adjacent to its opposite ends. In the unstretched condition, the outer diameter dimension of the sealing member 22 is substantially less than the inside diameter of the pipe to be sealed so that the sealing member 22 can be easily pushed through the inside of the pipe. The cylindrical body portion 26 of the sealing member 22 is formed of a thin-wall cylindrical elastic material which is stretchable to the inside diameter of the pipe to be sealed. The pair of annular ridges 28 have an inverted V-shape constructed of a solid elastic material (FIG. 4) and are spaced apart in a lengthwise direction along the cylindrical body 26 a sufficient distance to engage the inside surfaces of adjoining pipe sections 30, 32 (see FIG. 3) adjacent their abutting ends at 34.

The inner retainer member 24 of the sealing device 20 is fabricated from an elongated strip of pliable material, such as rolled steel, that is rolled into a split sleeve configuration with its opposite ends 36, 38 in an overlapping relationship. Prior to installation, the split sleeve 37 is coiled to a sufficiently small size to fit inside the cylindrical body 26 of outer sealing member 22. After the sealing device 20 is positioned inside a gas main and centered with respect to a pipe joint 34 (see FIG. 3), an expander mechanism, such as the one to be described in full detail hereinafter, pushes radially outwardly against the split sleeve 37 until the outer sealing member 22 is pressed into sealing engagement with the inside of the adjacent pipe sections 30, 32 as depicted in FIG. 3.

To hold the retainer member 24 in this sealing position, the end 36 (FIGS. 1-2) of the split sleeve 37 is provided with a locking means 40 comprising an overhanging lip portion extending away from and beyond the end 36. To accommodate two different size pipes, the locking means is provided with two separate locking positions. The inner locking position is formed by a center segment 44 extending from the end 36 and a pair of end segments 46 integrally formed with the end 36 and bent upwardly and away from the center segment 44 to define a first locking groove 48 therebetween. The second locking position is defined by the pair of end segments 46 and an elongated rectangular strip 50 having a thickened portion at its opposite ends 52 welded to the top surface of the pair of end segments 46, forming a second locking groove 54 therebetween.

It is of course necessary that the material selected for the retainer member 24 be of sufficient rigidity and strength to hold the sealing member 22 in the sealed position. It has been found that a sleeve fabricated from 20-gauge hot-rolled steel performs this function quite satisfactorily. To strengthen the ends 36, 38 of the split sleeve 37, a number of stiffening ribs 58 and 60 are provided.

SEAL INSTALLATION TOOL

There is shown in FIGS. 6a – 6b, an illustration of a seal installation tool, generally designated by the reference numeral 100 and incorporating the principles of this invention, disposed inside a gas main having pipe sections 30 and 32. The installation tool 100 has a generally elongated tubular structure whose overall diameter is sufficiently less than the diameter of pipe sections 30, 32 to permit it to be readily pulled through the gas main in either direction.

The seal installation tool 100 comprises a cable connector assembly 102, a leak detector assembly 104, a front centering assembly 106, a seal magazine assembly 108, a seal expander assembly 110, and a rear centering assembly 112. The details and cooperation of these various assemblies will be described hereinafter.

To move the seal installation tool 100 through the gas main in either direction, it is provided with front and rear eye-hook couplers 114 and 116, to which are fastened pull cables extending in opposite directions away from the seal installation tool 100.

Before the seal installation tool 100 can be used, it is necessary to first remove a section of the gas main from service and open up a hole at both ends of this section. The seal installation tool 100 is inserted into one end of this opened section of main. Two cables coupled to the front and rear eye-hook couplers 114 and 116 extend through the gas main section to hand-cranked wheels located at the two work holes for moving the installation tool 100 in either direction through the gas main section.

CABLE CONNECTOR ASSEMBLY

The cable connector assembly 102 at the forward end of the installation tool 100 provides the means for connecting an electrical power cable and an air pneumatic hose to the seal installation tool 100 to control and energize the various assemblies of the installation tool 100. Because the installation tool 100 tends to rotate as it is pulled through the section of gas main, the cable connector assembly 102 includes a rotatable adapter device 150 (FIG. 7a) to prevent the twisting of the electrical power cable and pneumatic hose as the installation tool 100 turns.

The rotatable connector adapter 150 comprises a slip-ring shaft 152 rotatably supported in a bearing 154, whose outer race is mounted at the forward end of the tubular casing 156 of the cable connector assembly 102. The bearing 154 is seated in an annular groove 158 provided in the forward end of tubular casing 156, and is locked in place by a bearing nut 160, which screws into the threaded end of the tubular casing 156. The bearing nut 160 has a large circular opening through its center to provide an entrance in the installation tool 100 for receiving the end of a pneumatic hose fastened to the coupler 162 and the end of an electrical power cable fastened to coupler 164 in the forward end of the slip-ring shaft 152. At the rearmost end of the slip-ring shaft 152 is provided a hose connector 166 for a hose (not shown) to supply air to the pneumatic components of the installation tool 100.

By virtue of the slip-ring shaft 152 being rotatably mounted with respect to the casing 156 of the connector assembly 102, it can be seen that the installation tool 100 can rotate within a gas main without causing the electrical power cable fastened to coupler 164 and the pneumatic air hose connected to coupler 162 to become twisted.

LEAK DETECTOR ASSEMBLY

Figure 7B:
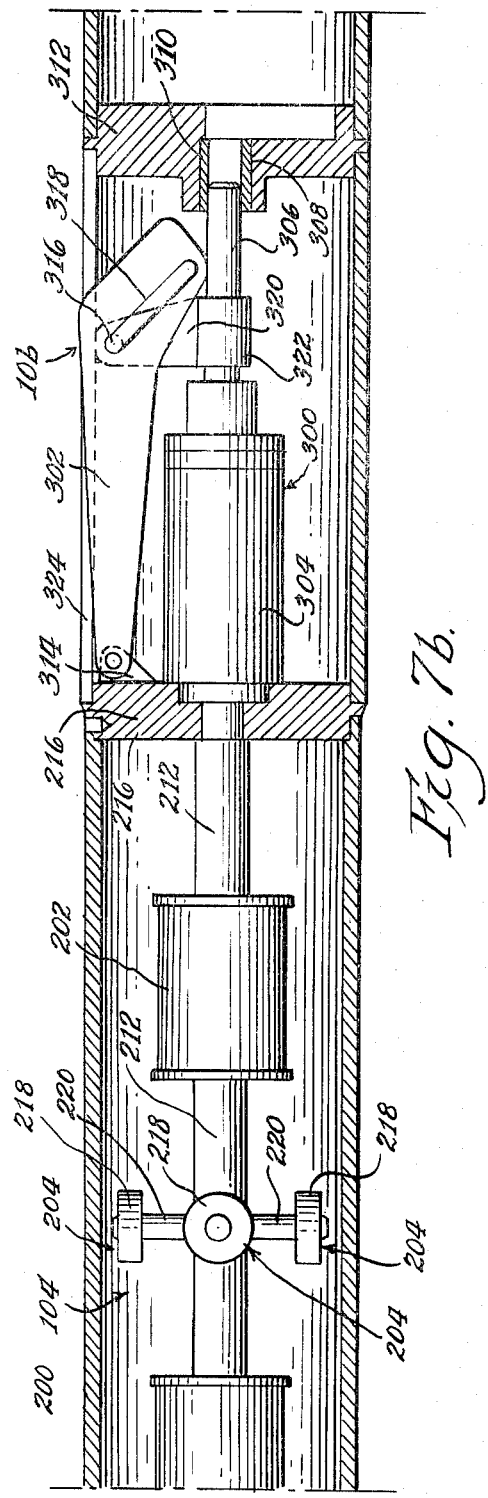

The leak detector assembly 104 depicted in FIG. 7a–7b, serves to detect joint and circumferential walls, fissures, cracks and the like in the wall of a gas main by sensing variations in electromagnetic force because of a change in reluctance of the pipe. The leak detector assembly 104 could be any of a number of well-known leak-detecting devices and is disclosed herein for the purpose of showing its use in combination with the pipe sealing system of this invention. It is to be understood that the leak detector assembly 104 is sufficiently sensitive to detect joints and the like at any location in the pipe, that is, it would detect all fissures which are prone by their size to cause leakage.

The leak detector assembly 104 has two primary electromagnetic units 200, 202 oriented lengthwise of the seal installation tool 100, and four equally spaced secondary electromagnetic units 204, 206, 208 and 210 extending radially from the axis of the installation tool 100. The pair of primary electromagnetic units 200, 202 are mounted in a spaced relationship along a magnetic permeable rod 212. The outer ends of rods 212 are mounted in the center of a pair of magnetic permeable discs 214, 216. The four secondary electromagnetic units 204, 206, 208 and 210 are each composed of electrical coil 218 mounted at the outer end of four radially oriented bolts 220, whose threaded inner ends are screwed into threaded apertures in the sides of the magnetic permeable rod 212 in a 90° spaced apart relationship.

The primary electromagnetic units 200, 202 have their coils excited by an A-C voltage to create a series of electromagnetic lines of force between the pair of permeable disc 214, 216 and the four secondary electromagnetic units 204. When the installation tool 100 is placed in a gas main, lines of force pass from the pair of disc 214, 216 to the four secondary electromagnetic units 204. If the reluctance of the pipe is uniform indicating no flaws in the pipe, the resulting induced voltage in the secondary electromagnetic units 204 will be zero. On the other hand, if there is a break or flaw in the gas main, a voltage will be induced in the secondary electromagnetic units 204 due to the difference in flux between the secondary units 204. Consequently, by moving the installation tool 100 through a gas main, the voltage induced in the secondary electromagnetic unit 204 will increase as primary electromagnetic unit 200 approaches the joint. At the moment, the secondary or detecting electromagnetic units 204 are at the position of the air gap, the lines of force of the two fields will nullify the resulting induction and the induced voltage will be zero. If the installation tool is moved further in the same direction, a new maximum voltage will be observed as the primary electromagnetic unit 202 passes over the joint. Thus, it is possible to indicate a joint or detectable flaw by moving the leak detector assembly 104 through a gas main until the remote meter indicates a zero between two maximum readings.

FRONT AND REAR CENTERING ASSEMBLIES

Prior to the step of expanding a sealing device 20 into sealing engagement with a pipe, it is necessary to center the seal installation tool 100 with respect to the pipe. For this purpose, there is provided front and rear centering assemblies 106, 112. The principle of operation of these two centering assemblies is the same, which consists of displacing in a radial direction a plurality of spaced skids to axially center the seal installation tool 100 with respect to the pipe.

Figure 14:
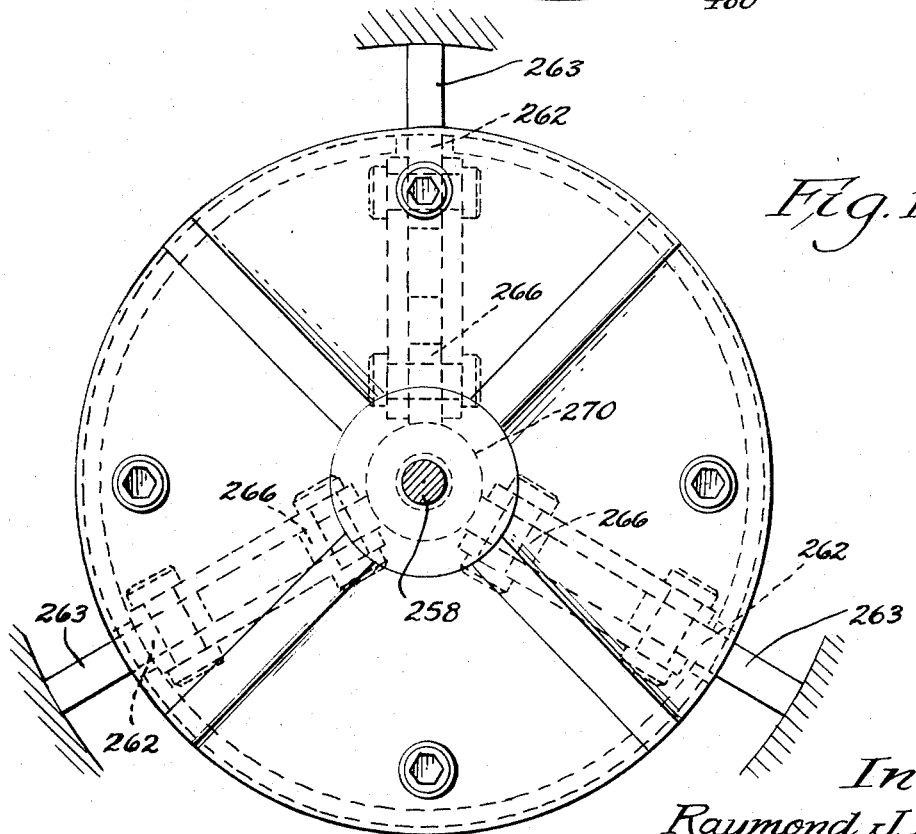
FIG. 14 is an end view of the rearward end of the seal installation tool.

The rear centering assembly 112 is located at the rearward end of the seal installation tool 100 (FIG. 7e) between an end plate 250 and a mounting plate 252. A cylinder and piston unit 254 is mounted along the center line of the seal installation tool 100 having its cylinder 256 mounted on the mounting plate 252 and its piston 258 slidably received in a bearing sleeve 260 formed in the center of end plate 250. The piston and cylinder unit 254 when energized moves three equally-spaced centering skids 262 (FIG. 14) in a radial direction between an inward stored position and an outward centering position.

The centering skids 262, having an outward bend 263 at their mid-section, are pivotally mounted between mounting clevises 264 on the mounting plate 252 and short links 266, whose other end is pivotally mounted to a collar 270 carried by the piston rod 258. When extended outwardly, the middle bent portion 263 of the centering skids 262 project through elongated openings 272 formed lengthwise in the casing 274 for the rear centering assembly 112.

The reciprocal movement of the piston and cylinder unit 254 for the rear centering assembly 112 is controlled by an air solenoid valve 280 located in a compartment forwardly of the mounting plate 252 and having a connection to the air piston and cylinder unit 254 through an opening (not shown) in the mounting plate 252.

The front centering assembly 106 is located near the forward end of the seal installation tool 100 between the leak detector assembly 104 and the seal magazine assembly 108. The front centering assembly 106 has a similar construction and operates in substantially the same manner as the rear centering assembly 112.

Referring to FIG. 7b, there is shown the front centering assembly 106 comprising a piston and cylinder unit 300 and three radially-extending, equally-spaced centering skids 302 (only one of which is shown). The piston and cylinder unit 300 is mounted along the center line of the seal installation tool 100 and has its cylinder 304 supported perpendicular from the magnetic permeable disc 216 and its piston 306 slidably received in a bearing sleeve 308 formed in the center opening 310 of a circular mounting plate 312. The centering skids 302 are pivotally mounted at one end to three equally-spaced clevises 314 extending from permeable disc 316. The centering skids 302 have a long segment extending from the mounting ears 314 and a short segment. The centering skids 302 are caused to pivot about the mounting ears 314 through the cooperating action of a stud 316 riding in elongated slot 318 formed in the outer free end of the centering skid 302. The studs 316 are formed on the outer ends of three equally-spaced, radially extending ears 320 formed on a cylindrical collar 322, which is fixed to the piston rod 306. It will be appreciated that the centering skids 302 move radially outwardly in unison when the piston and cylinder unit 300 is energized in a direction to cause the piston rod 306 to move outwardly. In their outward centered position, the three centering skids 302 project through elongated slots 324 in the tubular casing of the front centering assembly 106 and engage the inside peripheral surface of the surrounding pipe.

SEAL CARRIER ASSEMBLY

In order to permit the seal installation tool 100 to apply a number of seals without requiring the tool to be removed from the gas main section, seal magazine assembly 108 is provided, which carries a plurality of seals and conveys them one at a time to the seal expander assembly 110.

Referring to FIGS. 7c and 7d, the seal carrier assembly 108 is shown disposed forwardly of the seal expander assembly 110 and is housed in a tubular casing 300. Prior to inserting the installation tool 100 into the section of the gas main, a plurality of sealing devices 20 of the type illustrated in FIGS. 1 through 5 are slid over the casing 300.

The motive power for advancing the sealing devices 20 towards the seal expander assembly 110 is provided by air piston and cylinder unit 302, which is supported in the housing 300 in a lengthwise direction of the seal installation tool 100 and has its cylinder 304 fastened to the circular mounting plate 306. The piston rod 308 of the piston and cylinder unit 302 is coupled at its outer end to an indexing carriage 310 by means of a clevis 312.

The indexing carriage 310 has a U-shaped main body 314 (FIG. 9) and a pair of oppositely diverging arm portions 316. Secured to the ends of the arm portions 316 are two guide blocks 318. The guide blocks 318 have an elongated structure with a bore 320 drilled through their length to permit the guide blocks 318 to be slidably received on a pair of guide rods 322. The guide rods 322 are mounted at diametrically opposite positions to the inside of outer casing 300 in a lengthwise direction for guiding the indexing carriage 310 along a line parallel to the axis of the installation tool 100.

Figure 9:
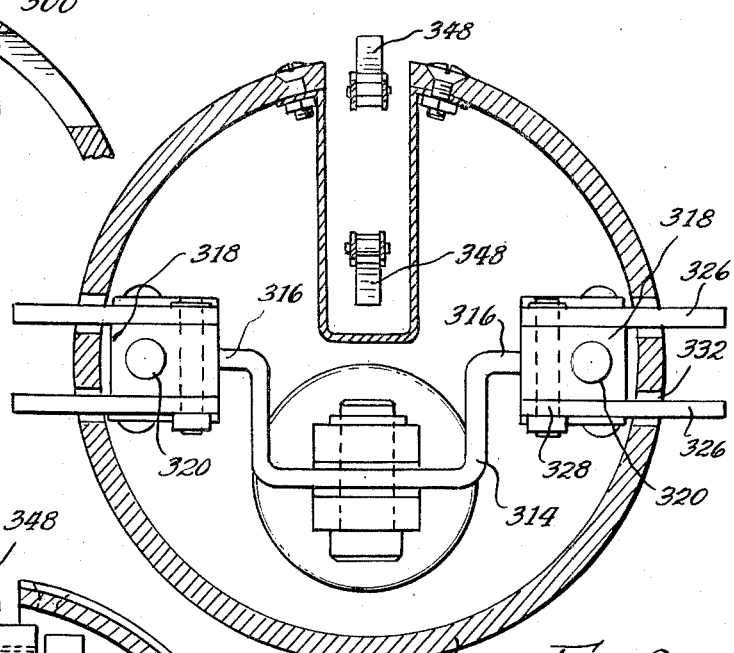
FIG. 9 is a sectional view taken along the line 9—9 of FIG. 7d.
Figure 10:
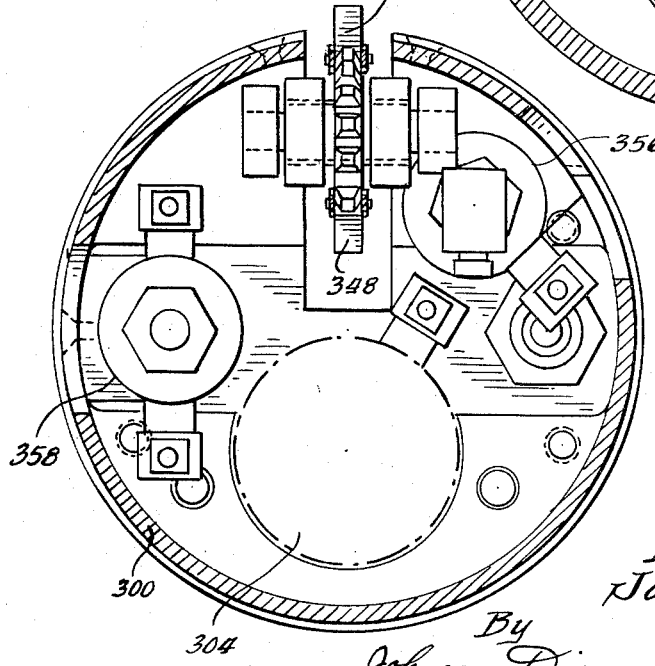
FIG. 10 is a sectional view taken along the line 10—10 of FIG. 7d.
Figure 11:
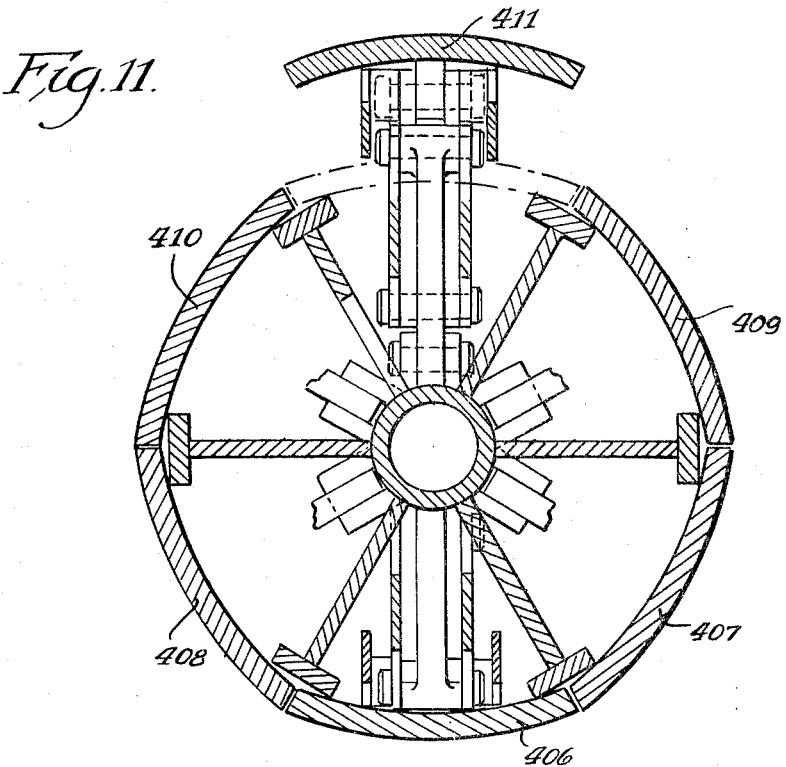
FIG. 11 is a sectional view taken along the line 11—11 of FIG. 7e.

Along the length of each guide block 318 there are mounted a number of indexing pawls 326 in sets of two, which are spaced apart a distance slightly greater than the width of the sealing devices 20 and which are constantly urged outwardly about their pivot pins 328 by means of a torsion spring 330. As shown in FIG. 9, each set of indexing pawls 326 project outwardly of the casing 300 through a pair of elongated slots 332 which extend lengthwise of the casing 300 at diametrically opposite positions.

It will be appreciated from the illustration of FIG. 7c, that the indexing carriage 310 is adapted to carry only three sealing devices 20. In order to increase the storage capacity of the seal magazine assembly 108, a chain driven unit 340 is provided which cooperates with the indexing carriage 310. As best shown in FIG. 7d, the chain driven unit 340 comprises an endless chain 341 wrapped around two end chain sprockets 342, 344 and an intermediate chain sprocket 346 and disposed in a chain guard U-shaped member 347 (FIG. 9). With respect to the indexing pawls 326, the chain 341 extends lengthwise of the casing 300 at a 90° angle from the guide blocks 318 (FIG. 9). The chain 341 has a series of indexing lugs 348 which project outwardly through a lengthwise slot 350 formed in the casing 300. The length of the chain device 340 is substantially greater than the length of the guide blocks 318 to permit several additional sealing devices 20 to be loaded on the seal magazine assembly 108.

The drive chain unit 340 is driven through the pushing action of the two sealing devices 20 as they are advanced by the indexing carriage 310, namely the second two sealing devices 20 away from seal expander assembly 110 (see FIGS. 7c and 7d). When the piston and cylinder unit 302 is energized to extend the piston rod 308 outwardly, the indexing carriage 310 advances the first three sealing devices 20 adjacent the expander assembly 110 forwardly one place, and since the second two sealing devices are also engaged by lugs 348 on chain 341, the chain unit 340 is likewise advanced one place.

To hold the sealing devices 20 into engagement with the lugs 348 of chain 341, a plurality of spring leaf elements 343 are mounted on the casing 300 directly below the chain 341.

Also supported by mounting plate 306 are the feed and retract air solenoid valves 356 and 358 which control the energization of the piston and cylinder unit 302 in a manner to be described hereinafter.

SEAL EXPANDER ASSEMBLY

The heart of the seal installation tool 100 is the seal expander assembly 110, which is contained in housing 400. The forward end of the housing 400 has a reduced diameter portion 402 and is provided with six equally spaced arcuate cutouts 404 to accommodate the drive members for six expander shoes 406-411 arranged about the periphery of the reduced diameter portion 402. The expander shoes 406 are formed as curved plates having a length slightly greater than the length of the sealing device 20 (FIG. 1).

The inward and outward movement of each of the expander shoes 406-411 is individually controlled by its own air piston and cylinder unit 410 through the cooperating action of six identical toggle link mechanisms 412. The air piston and cylinder units 410 have air cylinders 416 (shown with their middle portions deleted in FIG. 7e) pivotally mounted in an equal-spaced relationship about the center line of the installation tool 100 on a pivot flange 418.

The toggle link mechanism 412 for each of the expander shoes 406-411 is identical and comprises two pairs of expander links 420, 422, a guide link 424 and a piston coupler line 426. The pair of expander guide links 420 have one end pivotally connected to a pair of radially extending ears 430 which extend radially from the pivot tube 432 extending along the center line of the seal installation tool 100, and at its outer end pivotally connected to the piston coupler line 426. The other pair of shoe expander links 422 is pivotally connected at its inner end to the piston coupler links 426 and pivotally connected at its outer end to the expander shoe 406. To guide the toggle link mechanism 412 for moving the expander shoes 406-411 in a radial direction, the guide link 424 is provided having one end pivotally connected to the housing 400 and its other end pivotally connected to one of the expander shoes 406-411.

Figure 7E:
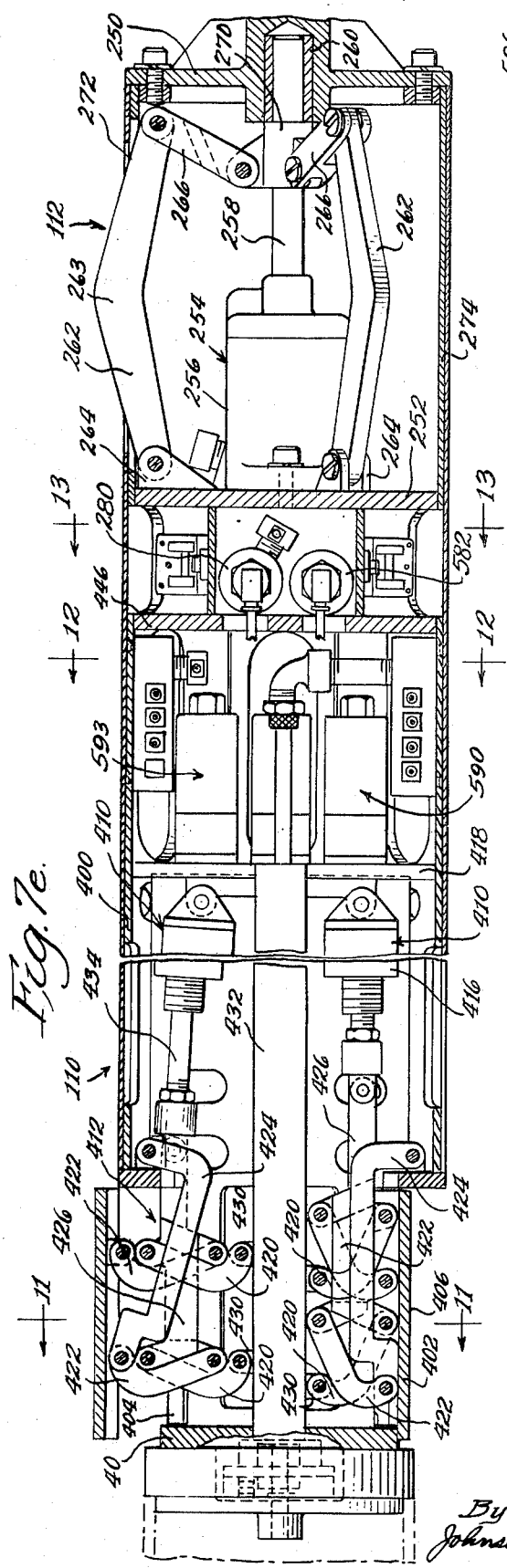

FIG. 7e illustrates the relative position of the links forming the toggle link mechanism 412 when the shoe is in the expanded position (upper shoe 411) and the inner stored position (lower shoe 406). As will be described in more detail hereinafter, the shoes 406-411 open sequentially one at a time to expand the sealing device 20 to a locked sealed position. To cause the shoes to move radially outwardly, the air piston and cylinder units 410 must be energized in a direction to cause their piston rods 434 to move outwardly.

Individual control over each air piston and cylinder unit 410 is provided by six normally closed solenoid valves 589-594 (FIG. 12) mounted on the rear side of the pivot flange 418 and normally opened solenoid valves 588. Solenoid valves 589-594 are mounted on pivot flange 418 and solenoid valve 588 is mounted on mounting flange 446. As illustrated in FIG. 13, upper and lower electrical terminal boards 448 and 450 are also mounted on the wall 444 for providing terminal connections to the solenoid valves 280 and 588-594.

Figure 12:
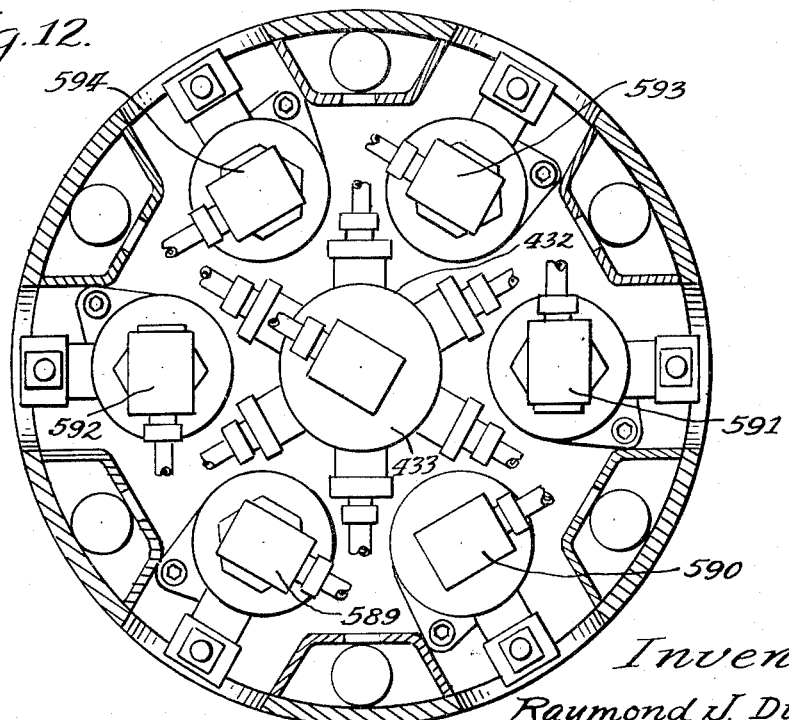
FIG. 12 is a sectional view taken along the line 12—12 of FIG. 7e.
Figure 13:
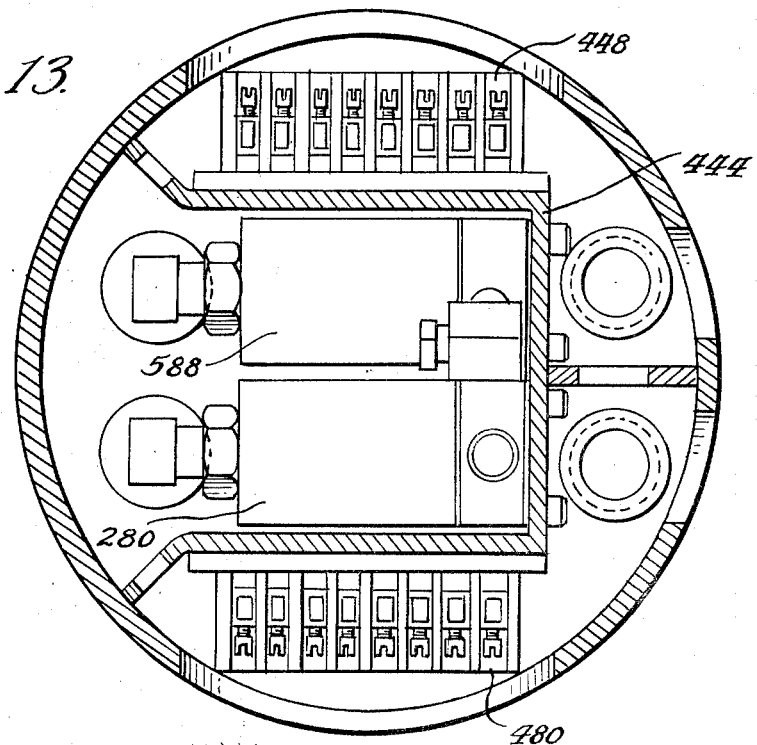
FIG. 13 is a sectional view taken along the line 13—13 of FIG. 7e.

Air is provided to the six piston and cylinder units 410 and the solenoid valves 280 and 588-594 through pivot tube 432 and out the manifold 433 (FIG. 12).

USE AND OPERATION OF INSTALLATION OF SEAL INSTALLATION TOOL

Preparation for the repairing of leaks in a gas main consists of first removing the section of the gas main from service, opening work holes at the opposite ends of this section of the gas main, removing a portion of a pipe at either end of the section to be repaired, and positioning the seal installation tool 100 into the section of gas main at one end. Prior to the placing of the installation tool 100 into the gas main section, the seals 20 are loaded on the installation tool 100 with one seal disposed about the expander shoes 406 and the remaining seals on the seal magazine assembly 108. One end of a pneumatic air hose is then fastened to coupler 162 and an electrical cable is fastened to connector 164 of the cable connector assembly 102. The installation tool 100 is then placed in one end of the pipe section with the connector assembly 106 facing into the pipe section. The pneumatic air hose and electrical cable extends through the pipe section and out the opposite end, where they are connected to a control panel 500 (FIG. 15). Control panel 500 houses the various electrical components for controlling the operation of the installation tool 100. The front face 501 of the control panel has a plurality of switches and indicators used by the operator.

The installation tool 100 is moved slowly through the pipe section by a hand cable winch, and the joint locator meter 502 which is mounted on the front face of the control panel 501 is carefully observed. As the joint locator assembly 104 approaches a joint in the pipe, its electrical circuitry is disturbed by the magnetic discontinuity of the joint causing the needle 504 on the meter 502 to deflect. The installation tool 100 is then advanced a little further until the needle drops to the zero reading which is an indication of the exact location of the joint or leak. To apply a sealing device 200 at this location, the seal installation tool 100 is then advanced a distance equal to the distance between the secondary coils 204 of the leak detector assembly 104 and the expander shoes 406 of the seal expander assembly 110.

Once the installation tool 100 is properly located with respect to the leak or joint to be sealed, the front and rear centering assembly 106, 112 are energized to center the installation tool 100 with respect to the pipe section. This operation is performed by pushing the OUT buttons 540 and 542 on the control panel 500 (FIG. 15). Pressing the OUT push button 540 closes the electrical switch 546 (FIG. 16) to energize normally open solenoid valve 548, which introduces air into the piston and cylinder unit 300 in a direction to cause piston rod 306 to move outwardly with the result that the three centering skids 302 are moved to their outer centering position.

Likewise, the pressing of OUT button 542 closes the switch 550 to energize the normally open solenoid valve 280 in a direction to introduce air into the cylinder 256 of the piston and cylinder unit 254 in a direction to cause piston rod 258 to move outwardly with the result that the three centering skids 262 move to their outer centering position.

Figure 16:
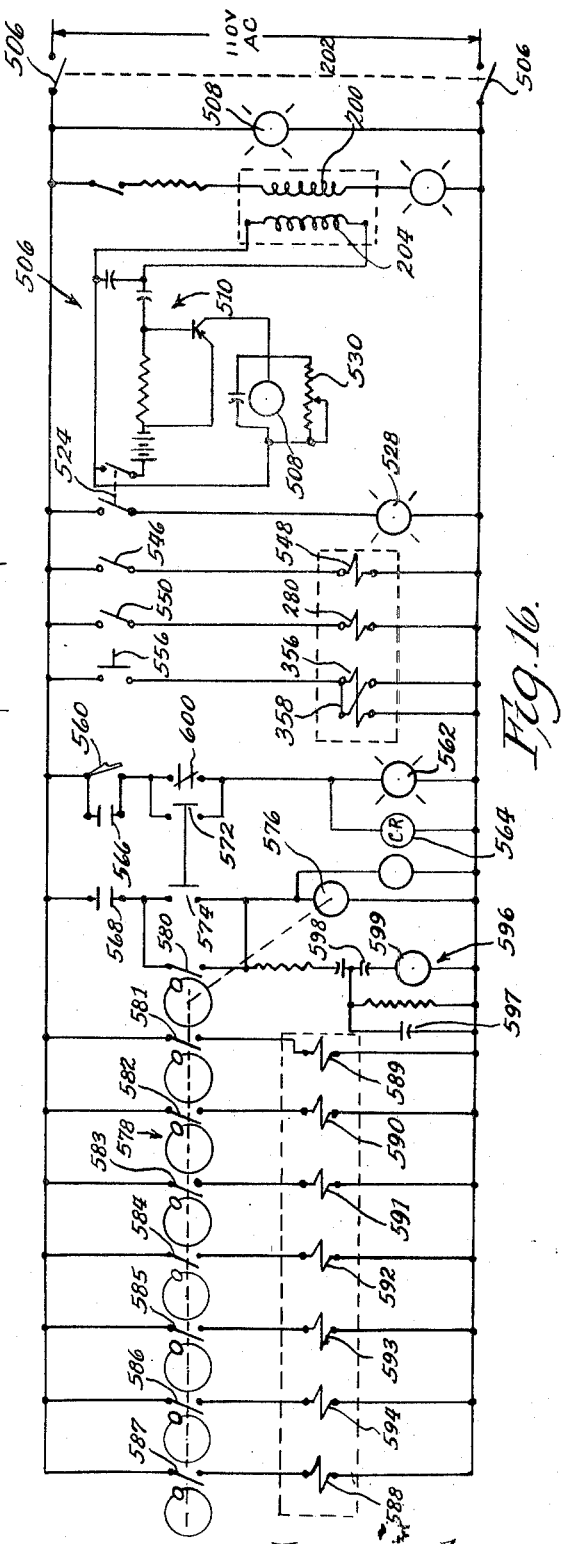
FIG. 16 is an electrical schematic diagram of the combined control panel and seal installation tool.
Figure 8:
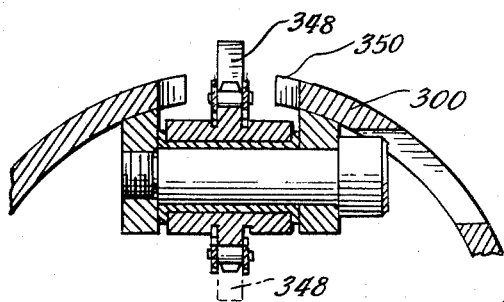
FIG. 8 is a sectional view taken along the line 8—8 of FIG. 7d.

The next operation is to feed a sealing device 20 onto the seal expander shoes 406. The operator depresses the SEAL FEED button 554 on the control panel 500 to close the the electrical switch 556 (FIG. 16). The closing of the electrical switch 556 energizes the normally closed solenoid valve 356 and the normally open solenoid valve 358. The normally closed solenoid valve 356 when opened supplies pressure to the cylinder 304 of the piston and cylinder unit 302 and the normally open solenoid valve 358 upon closing bleeds pressure from the retract side of the cylinder 304 to activate the seal magazine assembly 108. Consequently, the piston rod 308 moves outwardly to the end of its stroke causing the sealing devices 20 to be advanced one position. Throughout this operation, the SEAL FEED button 554 must be held in until the piston and cylinder unit 302 reaches the end of the feed stroke, at which point the lever roller microswitch 560 (FIG. 7d) closes. When the microswitch 560 closes, the expander ready-light 562 is ignited and a relay 564 is actuated. The actuation of the relay closes its relay contacts 566 and 568.

Upon the expander ready-light 562 becoming illuminated, the operator releases the SEAL FEED button 554 which de-energizes the solenoid valves 356 and 358 to cause the normally closed solenoid valve 346 to close and the normally open solenoid valve 358 to open with the result that the seal magazine assembly 108 moves in the reverse direction. As the piston rod 308 moves from its extended position, microswitch 560 is opened but the circuit to the relay 564 continues through the hold circuit established by relay contacts 566.

The operator next depresses the EXPANDER push button 570 to close the switch contacts 572 and 574. The closing of the switch contacts 574 closes the circuit to a motor 576 which turns the shaft of an eight cam-operated switch 578.

The motor 576 and the cam-operated mechanism 578 are housed in the control panel 500. The cam-operated mechanism 578 controls the closing of the switches 580-587. Switch 580 is closed immediately upon the turning of the motor shaft 576 and remains closed throughout the expander cycle. As the motor 576 continues to turn, switch 587 is first closed to energize the normally open solenoid valve 588, which functions to hold all six expander shoes 406-411 closed. The actuation of solenoid valve 588 closes and breaks down the retract side of the six expander cylinders 410. On the next rotation of the cam-operated mechanism 578, switch 581 opens the normally closed solenoid valve 589. Thereafter, on each succeeding revolution of the cam mechanism 578, the switches 582-586 are sequentially closed to open the normally closed solenoid valves 589-594, putting pressure on the expander cylinders 416 to extend the expander shoes 406-411 one at a time.

The reason for sequentially operating the expander shoes 406-411 is to insure that the sealing device 20 locks in sealing engagement with the inside peripheral surface of a pipe section. Referring to FIG. 1, it can be seen that the retainer member 37 must have its overlapping portions spread apart to place it in either of the two locked positions of FIG. 2. In operation of the seal expander assembly 110, the first expander shoe 406 to be extended is adapted to engage and push against the retainer member 37 at a diametrically opposite position to its overlapping portions. Next the shoes 407-408 on either side of shoe 406 are extended, followed by shoes 409-410, and finally shoe 411.

After all the expander shoes have been extended, on the next succeeding rotation of the cam mechanism 578, switch 587 is opened to cause the solenoid valve 588 to open and put pressure on the retract side of the expander cylinders 416. On the next three succeeding cycles, switches 581-586 are opened sequentially two at a time to close their respective solenoid valves 589–594 for bleeding the expand side of the expander cylinders 416 to cause the expander shoes 406–411 to retract.

After the shoes 406–411 have retracted, cam operated mechanism 578 opens the switch 580 on the next revolution to break the circuit to the motor 576 and also to a time delay circuit 596. Capacitors 597, 598 of the time delay circuit 596 discharge through a relay coil 599 to move the normally closed relay contact 600 to open. The opening of the relay contact 600 interrupts the power to the relay coil 564 causing its relay contacts 566, 568 to open which extinguishes the expander ready-light 570. After the capacitors 597, 598 have fully discharged through the solenoid 596, the solenoid 596 becomes de-energized and closes the contacts 600 to complete the expander cycle.

The installation tool 100 is then ready to begin another sealing cycle. The operator then depresses the IN buttons 604, 606 on the control panel 500 to open, respectively, the switches 546, 550 and de-energize the normally open solenoid valves 548, 280 reversing the pressure on the front and rear cylinders 304 and 256 to retract the front and rear centering skids 302 and 262. The installation tool 100 is then moved forwardly through the pipe until another leak is detected by the leak detector assembly 104.

We claim:

1. An installation tool used for applying a stretchable seal having a cylindrical sleeve configuration into sealing engagement with the internal peripheral surface of a pipe, comprising an elongated tubular body whose overall cross-sectional diameter is less than the inside diameter of said pipe, means for centering said tubular body with respect to said pipe and a seal expander assembly, said seal expander assembly including a plurality of curved plates of a width at least equal to the width of said stretchable seal that are arranged in a circular arrangement about the center line of said tubular body, power means for radially moving said curved plates to expand said seal into sealing engagement with said pipe, a seal magazine assembly for carrying a plurality of said stretchable seals and feeding them one at a time onto said curved plates including an elongated tubular casing adjacent one end of said curved plates having a diameter less than the diameter of said seals in their unstretched condition, at least one elongated slot formed lengthwise in said tubular casing, seal engaging finger members slidably mounted in said at least one slot and spaced apart a distance greater than the width of said stretchable seals by a seal forwarding means and a second power means for moving said seal forwarding means towards and away from said seal expander assembly to feed one of said plurality of seals over said curved plates and advance the remaining seals one position.

2. An installation tool used for locating a joint in a pipe section and for applying a stretchable seal having a cylindrical sleeve configuration into sealing engagement with the internal peripheral surface of the pipe section at the joint, comprising an elongated tubular body whose overall cross-sectional diameter is less than the inside diameter of said pipe, cable coupler means provided at the ends of said tubular for attaching cables thereto to pull said tubular body in either direction, a first and second centering means located at opposite ends of said tubular body for centering said tubular body with respect to said pipe section, a seal expander assembly, said seal expander assembly including a plurality of curved plates of a width at least equal to the width of said stretchable seal that are arranged in a circular arrangement about the center line of said tubular body, power means for radially moving said curved plates to expand said seal into sealing engagement with said pipe section to seal off said joint, and leak detector means for sensing a joint in said pipe section carried by said elongated tubular body and located adjacent said seal expander assembly.

3. A seal installation tool as defined in claim 1, wherein said power means includes a plurality of piston and cylinder units for each of said curved plates and means for coupling the piston rod of each of said piston and cylinder units to each one of said curved plates for moving said curved plates between a closed position and an expanded position.

4. An installation tool used for applying a stretchable seal having a cylindrical sleeve configuration into sealing engagement with the internal peripheral surface of a pipe, comprising an elongated tubular body whose overall cross-sectional diameter is less than the inside diameter of said pipe, means for centering, said tubular body with respect to said pipe and a seal expander assembly, said seal expander assembly including a plurality of curved plates of a width at least equal to width of said stretchable seal that are arranged in a circular arrangement about the center line of said tubular body, power means for radially moving said curved plates to expand said seal into sealing engagement with said pipe, said power means including a plurality of piston and cylinder units for each of said curved plates and means for coupling the piston rod of each of said piston and cylinder units to each one of said curved plates for moving said curved plates between a closed position and an expanded position, said plurality of piston and cylinder units disposed lengthwise of said tubular body and said means for coupling the piston rod of each of said piston and cylinder units to each one of said curved plates comprises a toggle link means for converting the reciprocal lengthwise movement of said piston rods into a corresponding reciprocating radial movement of said curved plates.

5. An installation tool used for applying a stretchable seal having a cylindrical sleeve configuration into sealing engagement with the internal peripheral surface of a pipe, comprising an elongated tubular body whose overall cross-sectional diameter is less than the inside diameter of said pipe, means for centering said tubular body with respect to said pipe and a seal expander assembly, said seal expander assembly including a plurality of curved plates of a width at least equal to the width of said stretchable seal that are arranged in a circular arrangement about the center line of said tubular body, power means for radially moving said curved plates to expand said seal into sealing engagement with said pipe, said power means including a plurality of piston and cylinder units for each of said curved plates and means for coupling the piston rod of each of said piston and cylinder units to each one of said curved plates for moving said curved plates between a closed position and an expanded position, and a control means for sequentially energizing said plurality of piston and cylinder units to move said plates into said expanded position in a sequential order.

6. An installation tool used for applying a stretchable seal having a cylindrical sleeve configuration into sealing engagement with the internal peripheral surface of a pipe, comprising an elongated tubular body whose overall cross-sectional diameter is less than the inside diameter of said pipe, means for centering said tubular body with respect to said pipe and a seal expander assembly, said seal expander assembly including a plurality of curved plates of a width at least equal to the width of said stretchable seal that are arranged in a circular arrangement about the center line of said tubular body, power means for radially moving said curved plates to expand said seal into sealing engagement with said pipe, said means for centering said tubular body comprises two centering assemblies disposed on opposite sides of said seal expander assembly, each of said two centering assemblies including an outer tubular casing having at least three equally spaced elongated lengthwise slots, at least three centering skids adapted to project radially through said slots to engage the inside peripheral surface of said pipe and means for moving said at least three skids in unison between a radial inward position and a radial outward position where said skids engage the inside peripheral surface of said pipe.

7. An installation tool used for applying a stretchable seal having a cylindrical sleeve configuration into sealing engagement with the internal peripheral surface of a pipe comprising an elongated tubular body whose overall cross-sectional diameter is less than the inside diameter of said pipe, means for centering said tubular body with respect to said pipe, means for expanding said seal radially relative to said tubular body until said seal is moved into sealing engagement with said pipe and means for carrying a plurality of said stretchable seals and for feeding them one at a time to said expanding means.

8. An installation tool as defined in claim 7, wherein said seal expanding means comprises a plurality of curved plates of a width at least equal to the width of said stretchable seal that are arranged in a circular arrangement about the center line of said tubular body and power means for radially moving said curved plates to expand said seal into sealing engagement.

9. An installation tool as defined in claim 7, wherein said means for carrying a plurality of said seals and for feeding them one at a time to said seal expanding means comprises an elongated tubular casing adjacent said expanding means, at least one elongated slot formed lengthwise in said tubular casing, seal engaging finger members slidably mounted in said at least one elongated slot and spaced apart a distance greater than the width of said seals by a seal forwarding and a power means for moving said seal forwarding means towards and away from said seal expanding means to advance the seals carried thereon one position.

10. A seal installation tool as defined in claim 8, wherein said power means includes a plurality of piston and cylinder units for each of said curved plates and means for coupling the piston rod of each of said piston and cylinder units to each one of said curved plates for moving said curved plates between a closed position and an expanded position.

11. A seal installation tool as defined in claim 10, wherein said plurality of said piston and cylinder units are disposed lengthwise of said tubular body in a circular arrangement and said means for coupling the piston rod of each of said piston and cylinder units to each one of said curved plates comprises a toggle link means for converting the reciprocal lengthwise movement of said piston rods into a corresponding reciprocating radial movement of said curved plates.

12. A seal installation tool as defined in claim 10, further comprising a control means for sequentially energizing said piston and cylinder units to move said curved plates into said expanded position in a sequential order.

13. A seal installation tool as defined in claim 7, wherein said means for centering said tubular body comprises two centering assemblies disposed on opposite sides of said seal expander assembly, each of said two centering assemblies including an outer tubular casing having at least three equally spaced elongated lengthwise slots, at least three centering skids adapted to project radially through said slots to engage the inside peripheral surface of said pipe and means for moving said at least three skids in unison between a radial inward position and a radial outward position where said skids engage the inside peripheral surface of said pipe.

* * * * *